No. 655,706. Patented Aug. 14, 1900.
G. C. GILLMORE.
STUFFING MACHINE FOR MANUFACTURING RODS AND TUBES FROM PYROXYLIN COMPOUNDS.
(Application filed Mar. 14, 1900.)
(No Model.)
3 Sheets—Sheet 2.
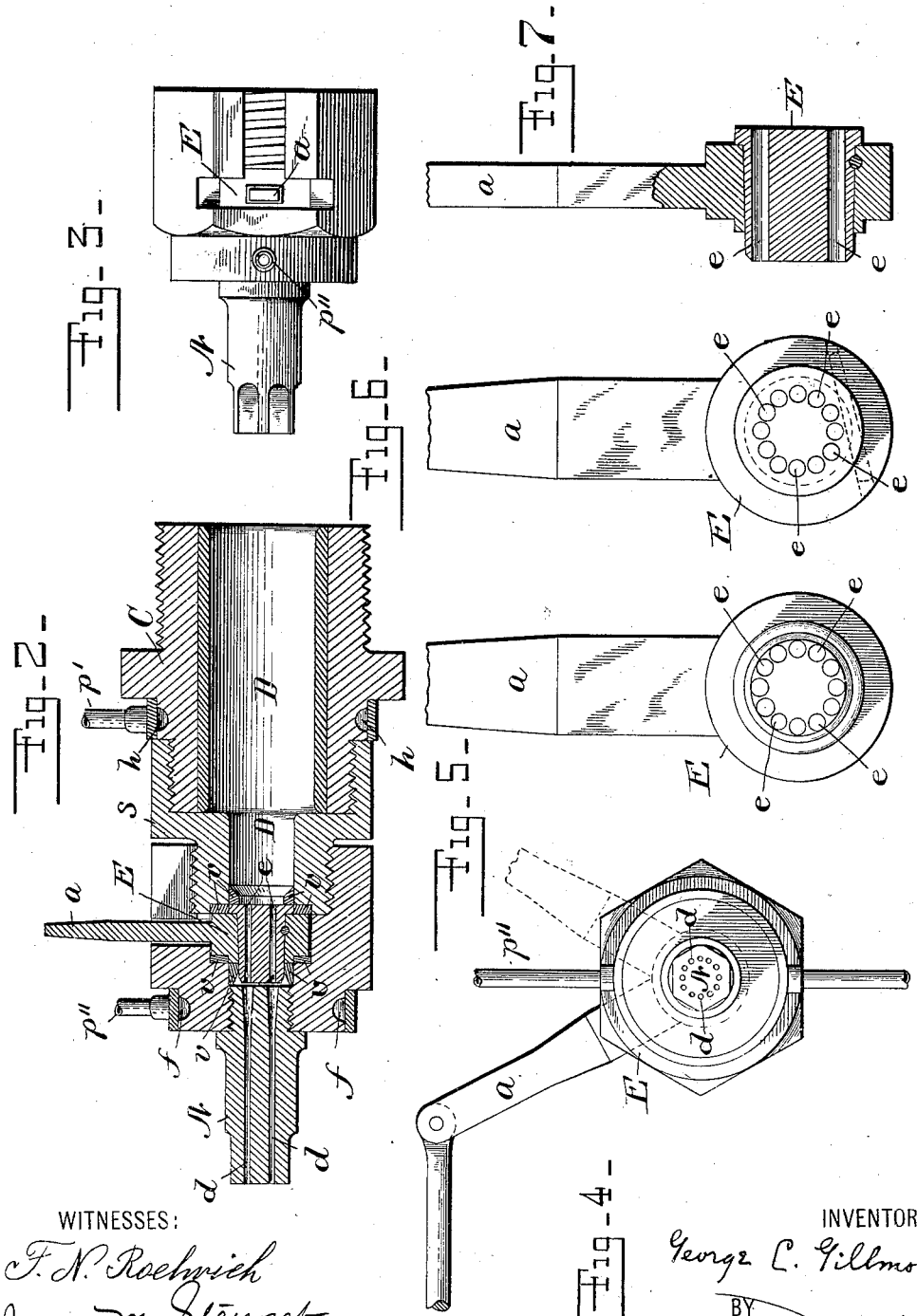
WITNESSES:
F. N. Roehrich
James M. Stewart
INVENTOR
George C. Gillmore
BY
J E Hindon Hyde
ATTORNEY No. 655,706. Patented Aug. 14, 1900.
G. C. GILLMORE.
STUFFING MACHINE FOR MANUFACTURING RODS AND TUBES FROM PYROXYLIN COMPOUNDS.
(Application filed Mar. 14, 1900.)
(No Model.) 3 Sheets—Sheet 3.
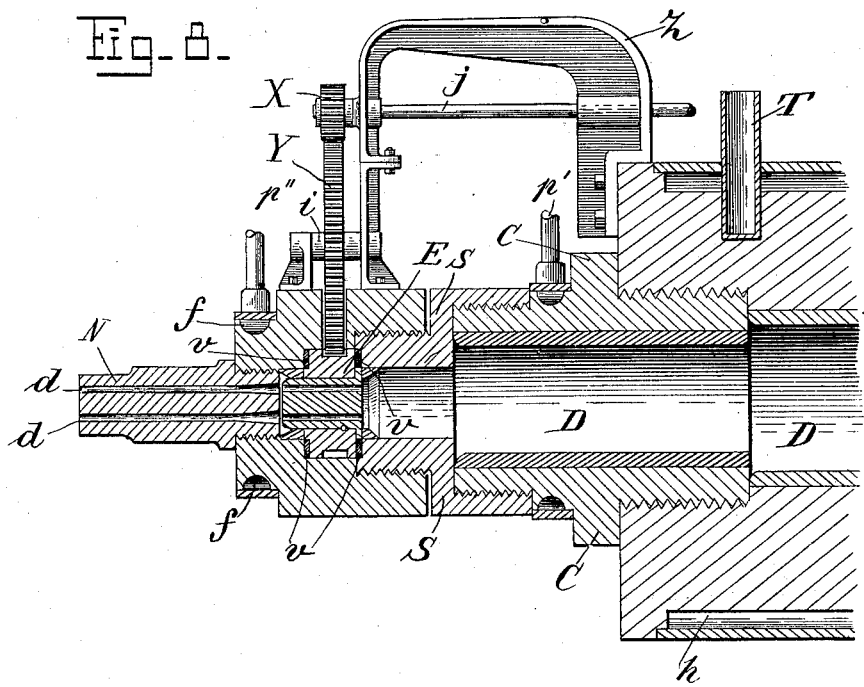
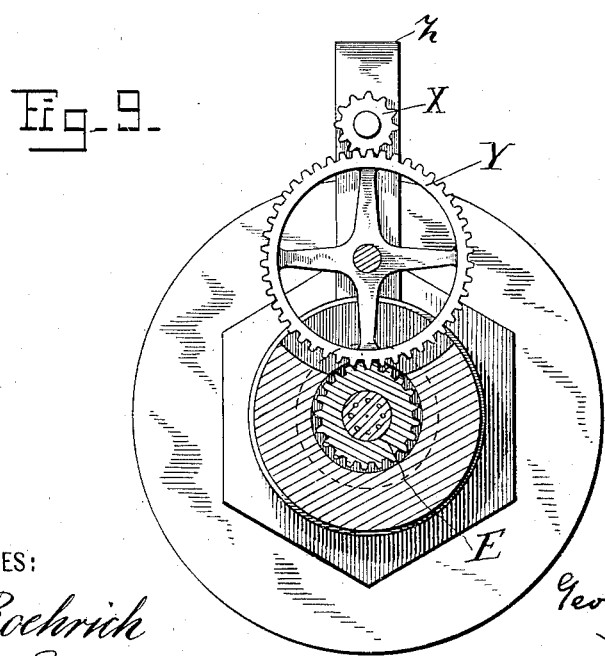
WITNESSES: INVENTOR
F. N. Roehrich George C. Gillmore
James M. Stewart BY
J. Hindon Hyde
ATTORNEY

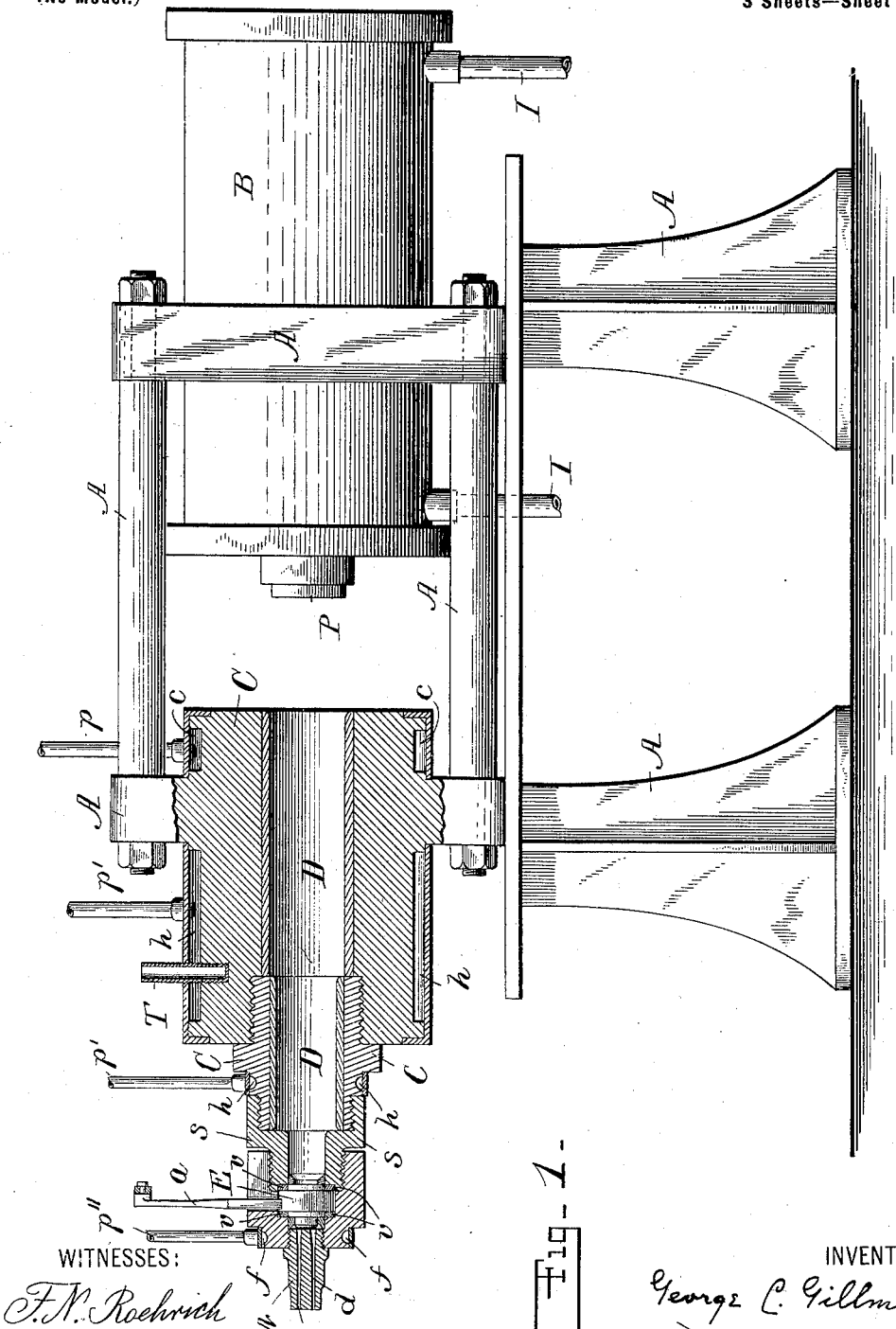

UNITED STATES PATENT OFFICE.

GEORGE C. GILLMORE, OF NEWARK, NEW JERSEY, ASSIGNOR TO THE CELLULOID COMPANY, OF NEW YORK, N. Y., A CORPORATION OF NEW JERSEY.

STUFFING-MACHINE FOR MANUFACTURING RODS AND TUBES FROM PYROXYLIN COMPOUNDS.

SPECIFICATION forming part of Letters Patent No. 655,706, dated August 14, 1900.

Application filed March 14, 1900. Serial No. 8,612. (No model.)

*To all whom it may concern:*

Be it known that I, GEORGE C. GILLMORE, a citizen of the United States, residing at Newark, in the county of Essex and State of New Jersey, have invented a new and useful Improvement in Stuffing-Machines for the Manufacture of Rods and Tubes from Pyroxylin Compounds or Analogous Plastic Materials, of which the following is a specification, reference being had to the accompanying drawings for the purpose of illustration.

It has heretofore been found impracticable to make satisfactory tubes and rods of such materials in the "stuffer" when mottled effects of two or more colors are desired—such as exist in imitation tortoise-shell, mottled amber, mottled marble, &c.—owing to the fact that the passage of the material consisting of two or more different colors through the machine tends to produce a streaked or stratified effect, due to the friction encountered, and it has therefore been necessary in making rods to first prepare the mottled material in sheet form, then cut it into strips, and subsequently round off the corners of such strips by cutting and subsequent polishing, thus entailing a large waste of material and expenditure of labor, while satisfactory tubes of mottled material had to be made by welding sheets upon a mandrel.

The object of my invention is to obviate these disadvantages in the production of rods and to facilitate the manufacture of tubes in the stuffer; and it consists in providing the stuffer near the nozzle with a cutter which cuts off the material in a direction transverse to the line of flow, and thus breaks it up, so as to produce a mottled instead of a striped or stratified effect.

Referring to the drawings, in which similar letters of reference refer to similar parts throughout the several views, Figure 1 shows a part perspective and part sectional view of my improved stuffer. Fig. 2 is a sectional view of one end of the stuffer, showing my improvement. Fig. 3 is a perspective view of a part of Fig. 2. Fig. 4 is a front end view of the nozzle and portions of my cutter. Fig. 5 shows an enlarged front view, Fig. 6 an enlarged rear view, and Fig. 7 an enlarged sectional side view, of the cutter. Fig. 8 illustrates in section a form of the machine in which the rotating disk which serves as a cutter for the material has a complete rotary motion; and Fig. 9 shows a front view, in part section and part elevation, of the same form of the device.

Having reference to the several figures, A represents the stand and frame of the stuffer.

B is a hydraulic-pressure cylinder having the water-inlets I and containing a piston (not shown) and the plunger P.

The front portion of the stuffer is made in sections, as shown, and containing the barrel D, which is made with decreasing diameters as it approaches the rotating disk E and nozzle N, as illustrated.

The sectional cylinder C contains the usual cold-water chamber $c$ and connecting-pipe $p$ and the steam-heated chambers $h$ and connecting-pipes $p'$. A thermometer T is inserted in the cylinder C. A reducing-nut $s$ is screwed to the end of the cylinder C. Each machine is provided with one or more of these "reducing-nuts," so called because while they all have a constant screw pitch for affixing them to the end of the cylinder C they have different pitches for the screws to which the different nozzles are secured and contain differently-sized bores to terminate the barrel D, so as to adapt them to the particular kind of nozzle in use. For purposes of illustration the drawings represent the nozzle N, which is provided with the usual steam-heated chamber $f$ and inlet-pipe $p''$, as having twelve channels $d$, through which the material issues, so as to form twelve rods simultaneously; but the nozzles are of different forms, so as to contain fewer, more, or larger or smaller bores, as desired. So, also, they may be nozzles in which the bores contain a mandrel in order to make tubes, as is well understood by those familiar with the art.

The nature of my improvement will be more especially seen from Figs. 2, 3, 4, 5, 6, and 7. In order to cut off and break up the plastic material just before it enters the bores or channels $d$ in the nozzle N, I interpose a cutter consisting of a rotating disk E, which is perforated with channels or bores $e$. This disk E is packed with vulcanized fiber $v$ or other suitable packing, as shown on a larger scale in Fig. 2. There is a rocking arm or lever $a$ secured to this disk, so that when this arm is caused to rock (by machinery not shown) the disk E partly rotates first in one direction and then in another, as shown in Fig. 4, and thus cuts transversely the material which has entered its bores at short or long intervals, as is desired, according to the rapidity of movement of the disk E, thus breaking up the colors passing through each of the bores separately, while not interrupting the continuous flow of the material through the bores of the disk E as a whole and thence through the bores in the nozzle.

The operation of my improved cutter is as follows: The stuffer being arranged to operate in the usual manner well understood by those skilled in the art, the material, consisting of two or more differently-colored components, is introduced into the rear of the barrel D. The "charge" may be composed of two differently-colored sheets rolled upon each other into the form of a cartridge, or the sheets may be fastened together and then cut into small blocks of regular or irregular shape, or, preferably, each sheet is cut into small pieces and the differently-colored pieces then intermingled thoroughly and introduced into the barrel in a quantity sufficient to form a charge. The plunger P then advances, pressing the charge before it through the narrowing barrel D until it encounters the rotating disk E, at which time it is in a plastic condition. It then enters the bores in the disk E, whereupon it is cut at intervals by the partial rotation of this disk. This cuts and breaks up the material, so as to produce the desired mottled effect and prevent streaks and striations. The material thence passes from the bores in the rotating disk E into those in the nozzle N and emerges in the form of mottled rods or tubes.

It is obvious that I can accomplish the same purpose in an analogous way by imparting a complete rotary motion to the disk E instead of an oscillating rotation, as illustrated in Figs. 8 and 9 of the drawings. In this form of the device the rotating disk E is provided with teeth on its periphery, which mesh with the toothed wheel Y, which is in gear with the pinion X, mounted upon the shaft $j$, revolving on bearings in the frame Z, which also sustains one end of the shaft $i$, upon which the toothed wheel Y is mounted. I have not considered it necessary to show the source of power or the means of rotating the shaft $j$, as they will be readily understood by any mechanic. I do not limit myself to the specific means described and illustrated in Figs. 8 and 9 for giving the disk E a complete rotary motion; but it may be pointed out that any suitable means may be adopted which will give the rotating disk E a comparatively-slow motion, so as not to break up the material too much as it passes through the channels in said disk. I can even dispense with the separate disk entirely and give the nozzle itself a partial or a complete rotary motion, in which case the nozzle acts as a rotating cutter; but I prefer the construction shown.

Having thus described my invention, what I claim is—

1. In a stuffing-machine, means for cutting and reuniting at intervals the material passing through the stuffer, such cutting being in a direction transverse to the line of flow of said material, substantially as described.

2. In a stuffing-machine, a rotating perforated disk adjacent to and behind the nozzle, substantially as and for the purpose described.

3. In a stuffing-machine, substantially as described, the rotating disk E having the rocking arm $a$, substantially as and for the purpose set forth.

GEORGE C. GILLMORE.

Witnesses:
WALTER P. LINDSLEY,
SYLVESTER M. COOLEY.